US012531077B2

(12) United States Patent
Tian et al.

(10) Patent No.: US 12,531,077 B2
(45) Date of Patent: Jan. 20, 2026

(54) METHOD AND APPARATUS IN AUDIO PROCESSING

(71) Applicant: TENCENT AMERICA LLC, Palo Alto, CA (US)

(72) Inventors: Jun Tian, Belle Mead, NJ (US); Xiaozhong Xu, State College, PA (US); Shan Liu, San Jose, CA (US)

(73) Assignee: Tencent America LLC, Palo Alto, CA (US)

( * ) Notice: Subject to any disclaimer, the term of this patent is extended or adjusted under 35 U.S.C. 154(b) by 396 days.

(21) Appl. No.: 17/450,015

(22) Filed: Oct. 5, 2021

(65) Prior Publication Data

US 2022/0270626 A1 Aug. 25, 2022

Related U.S. Application Data

(60) Provisional application No. 63/152,086, filed on Feb. 22, 2021.

(51) Int. Cl.
*G10L 21/003* (2013.01)
*G10L 21/04* (2013.01)

(52) U.S. Cl.
CPC ............ *G10L 21/003* (2013.01); *G10L 21/04* (2013.01)

(58) Field of Classification Search
CPC ....... G10L 19/167; G10L 21/02; G10L 21/00; G10L 21/003; G10L 21/0316; G10L 21/034; G10L 21/0356; G10L 21/04; G10L 21/055
USPC ......................................... 704/224, 225, 500
See application file for complete search history.

(56) References Cited

U.S. PATENT DOCUMENTS

2010/0046765 A1* 2/2010 De Bruijn .............. H03G 3/001 381/104
2011/0054887 A1* 3/2011 Muesch .................... H04S 3/00 704/226
2014/0050325 A1* 2/2014 Norris ................... G10L 19/008 381/23

(Continued)

FOREIGN PATENT DOCUMENTS

JP 2016520865 A 7/2016

OTHER PUBLICATIONS

International Search Report and Written Opinion dated Jan. 21, 2022 issued in corresponding application PCT/US21/53931.

(Continued)

*Primary Examiner* — Richemond Dorvil
*Assistant Examiner* — Rodrigo A Chavez
(74) *Attorney, Agent, or Firm* — ArentFox Schiff LLP

(57) ABSTRACT

Aspects of the disclosure provide methods and apparatuses for audio processing. In some examples, an apparatus of audio coding includes processing circuitry. The processing circuitry decodes, from a coded bitstream, information indicative of an adjusted speech signal and a loudness adjustment to the adjusted speech signal. The adjusted speech signal is indicated in an association with multiple speech signals in a scene of an immersive media application. The processing circuitry determines a plurality of loudness adjustments to sound signals including the multiple speech signals in the scene based the plurality of loudness adjustment to the adjusted speech signal, and generates the sound signals in the scene based on the loudness adjustments to the sound signals.

20 Claims, 4 Drawing Sheets

(56) References Cited

U.S. PATENT DOCUMENTS

2014/0324419 A1* 10/2014 Beerends ................ G10L 25/69
704/225
2015/0296086 A1* 10/2015 Eckert ........................ H04S 5/00
381/17
2015/0348564 A1* 12/2015 Paulus ...................... H03G 3/20
704/500
2015/0356978 A1* 12/2015 Dickins ............... G10L 19/0208
704/226
2016/0219387 A1 7/2016 Ward et al.
2016/0225387 A1* 8/2016 Koppens ................. G10L 19/20
2017/0032803 A1* 2/2017 Pandey ............... G10L 21/0208
2017/0084295 A1* 3/2017 Tsiartas ................... G10L 17/08
2018/0295240 A1* 10/2018 Dickins ................. H04M 3/568
2019/0174245 A1* 6/2019 Lyren ....................... H02M 1/08
2019/0318757 A1* 10/2019 Chen ...................... G10L 19/022
2019/0341060 A1* 11/2019 Hines ......................... H04S 3/02
2020/0075038 A1* 3/2020 Sung ................... H04M 3/2236
2022/0294904 A1* 9/2022 Shah ................... H04M 3/5166
2022/0358965 A1* 11/2022 Wang ........................ H04R 3/04
2022/0383885 A1* 12/2022 Dillen .................. H04N 21/233
2023/0162754 A1* 5/2023 Yeh .......................... G10L 25/84
704/202
2023/0306645 A1* 9/2023 Tian ........................ G06T 9/001

OTHER PUBLICATIONS

"Draft MPEG-I Immersive Audio Call for Proposals", WG 6, MPEG Audio Coding, ISO/IEC JTC 1/SC 29/WG 6 N0032 , Serial No. 20147, Jan. 15, 2021 (14 pages).

Appendix A, Reproduction Level Adjustment for CfP Test (5 pages).

Supplementary European Search Report issued in Application No. 21927007.1 issued Jul. 3, 2023, 9 pages.

Japanese Office Action issued in Application No. 2022-556588 issued Oct. 10, 2023, 10 pages.

* cited by examiner

METHOD AND APPARATUS IN AUDIO PROCESSING

INCORPORATION BY REFERENCE

This present disclosure claims the benefit of priority to U.S. Provisional Application No. 63/152,086, "Scene Loudness Adjustment" filed on Feb. 22, 2021. The entire disclosure of the prior application is hereby incorporated by reference in its entirety.

TECHNICAL FIELD

The present disclosure describes embodiments generally related to audio processing.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

In an application of virtual reality or augmented reality, to make a user have the feeling of presence in the virtual world of the application, audio in a scene of the application is perceived as in real world, with sounds coming from associated virtual figures the scene. In some examples, physical movement of the user in the real world is perceived as having matching movement in the virtual scene in the application. Further, and importantly, the user can interact with the virtual scene using audio that is perceived as realistic and matches the user's experience in the real world.

SUMMARY

Aspects of the disclosure provide methods and apparatuses for audio processing. In some examples, an apparatus of audio coding includes processing circuitry. The processing circuitry decodes, from a coded bitstream, information indicative of an adjusted speech signal and a loudness adjustment to the adjusted speech signal. The adjusted speech signal is indicated in an association with multiple speech signals in a scene of an immersive media application. The processing circuitry determines a plurality of loudness adjustments to sound signals including the multiple speech signals in the scene based the loudness adjustment to the adjusted speech signal, and generates the sound signals in the scene based on the plurality of loudness adjustments to the sound signals.

In some examples, the processing circuitry decodes, from the coded bitstream, an index that is indicative of one of the multiple speech signals being the adjusted speech signal.

In an example, the information is indicative of a loudest speech signal in the multiple speech signals being the adjusted speech signal. In another example, the information is indicative of a quietest speech signal in the multiple speech signals being the adjusted speech signal.

In some examples, the information is indicative of the adjusted speech signal having an average loudness of the multiple speech signals.

In some examples, the information is indicative of the adjusted speech signal having an average loudness of a loudest speech signal and a quietest speech signal in the multiple speech signals.

In some examples, the information is indicative of the adjusted speech signal having a median loudness of the multiple speech signals.

In some examples, the information is indicative of the adjusted speech signal having an average loudness of a group of speech signals. The group of speech signals has loudness of a quantile of the multiple speech signals.

In some examples, the processing circuitry determines a speech signal associated with a location to be the adjusted speech signal. The location is a closest location to a center of locations associated with the multiple speech signals.

In some examples, the information is indicative of the adjusted speech signal having a weighted average loudness of the multiple speech signals. In an example, the processing circuitry determines weights for the multiple speech signals based on locations of the multiple speech signals. In another example, the processing circuitry determines weights for the multiple speech signals based on respective loudness of the multiple speech signals.

Aspects of the disclosure also provide a non-transitory computer-readable medium storing instructions which when executed by a computer cause the computer to perform the method of audio processing.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF EMBODIMENTS

Aspects of the disclosure provide techniques for audio loudness adjustment in association with scenes in immersive media applications. In an immersive media application, such as an interactive virtual reality (VR) or augmented reality (AR), different sound levels in a scene can be setup by various techniques, such as by a technical setup, by loudness measurements, by manual setup and the like. According to some aspects of the disclosure, when sound signals associated with a scene in an immersive media application include multiple speech signals, a loudness of an adjusted speech signal can be determined based on the multiple speech signals in the scene of the immersive media application. Then, a loudness adjustment for the adjusted speech signal is determined to match the loudness of the adjusted speech signal with a reference signal. Further, loudness of sound signals in association with the scene can be adjusted based on the loudness adjustment of the adjusted speech signal. In some examples, information indicative of the adjusted speech signal and the loudness adjustment for the adjusted speech signal can be coded in a bitstream that carries coded information for generating the sound signals, such as a bitstream that carries immersive media for the immersive media application. Then, in some examples, when user equipment with immersive media player receives the bitstream, the user equipment can determine, for the scene, the adjusted speech signal based on information in the bitstream. Further, based on the loudness adjustment of the adjusted speech signal, the user equipment can adjust the sound signals in association with the scene.

Figure 1:
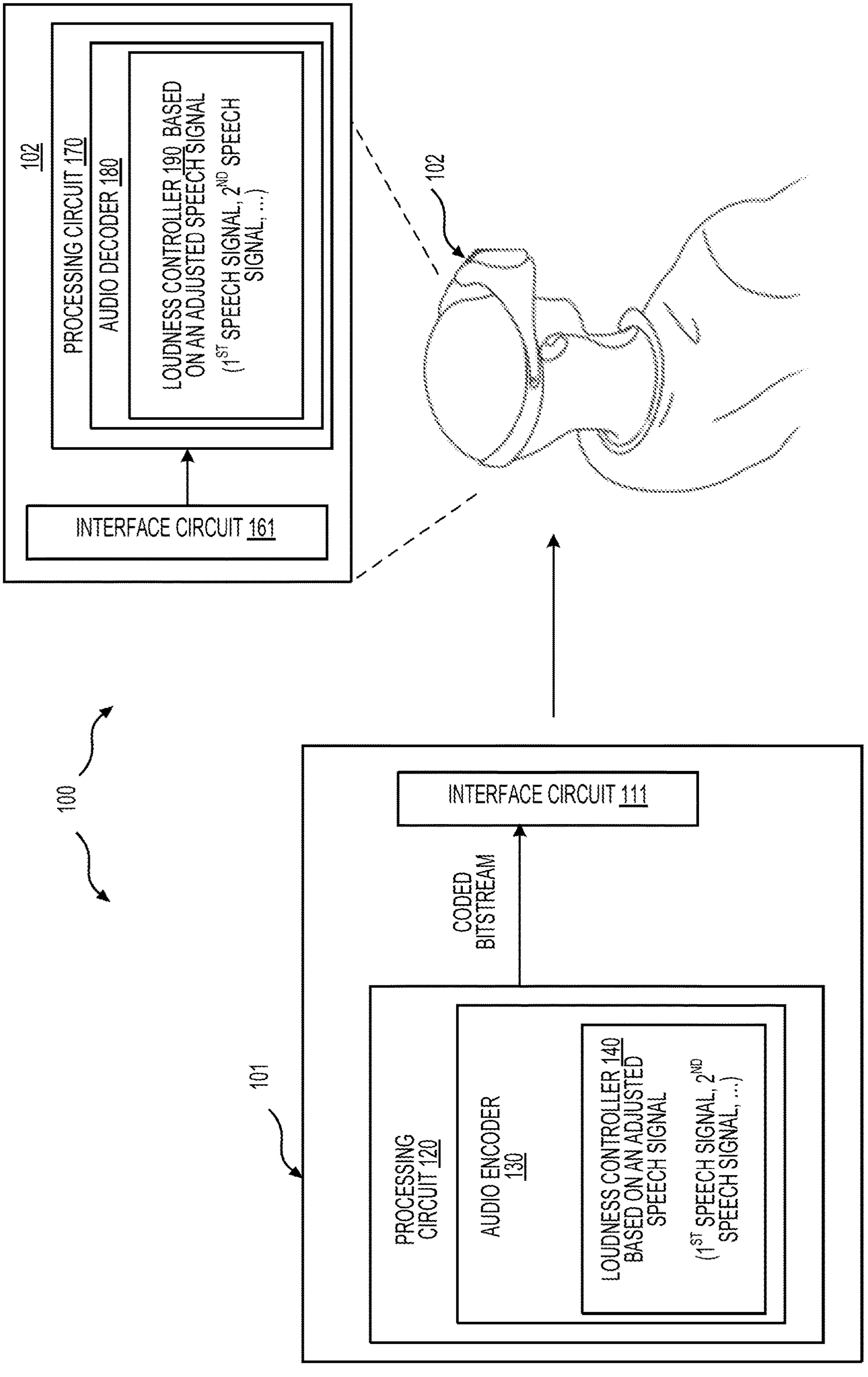
FIG. 1 shows a block diagram of an immersive media system according to an embodiment of the disclosure.

FIG. 1 shows a block diagram of an immersive media system (100) according to an embodiment of the disclosure. The immersive media system (100) can be used in various use applications, such as augmented reality (AR) application, virtual reality application, video game goggles application, sports game animation application, and the like.

The immersive media system (100) includes an immersive media encoding sub system (101) and an immersive media decoding sub system (102) that can be connected by a network (not shown). In an example, the immersive media encoding sub system (101) can include one or more devices with audio coding and video coding functionalities. In an example, the immersive media encoding sub system (101) includes a single computing device, such as a desktop computer, a laptop computer, a server computer, a tablet computer and the like. In another example, the immersive media encoding sub system (101) includes data center(s), server farm(s), and the like. The immersive media encoding sub system (101) can receive video and audio content, and compress the video content and audio content into a coded bitstream in accordance to suitable media coding standards. The coded bitstream can be delivered to the immersive media decoding sub system (102) via the network.

The immersive media decoding sub system (102) includes one or more devices with video coding and audio coding functionality for immersive media applications. In an example, the immersive media decoding sub system (102) includes a computing device, such as a desktop computer, a laptop computer, a server computer, a tablet computer, a wearable computing device, a head mounted display (HMD) device, and the like. The immersive media decoding sub system (102) can decode the coded bitstream in accordance to suitable media coding standards. The decoded video contents and audio contents can be used for immersive media play.

The immersive media encoding sub system (101) can be implemented using any suitable technology. In the FIG. 1 example, the immersive media encoding sub system (101) includes a processing circuit (120) and an interface circuit (111) coupled together.

The processing circuit (120) can include any suitable processing circuitry, such as one or more central processing units (CPUs), one or more graphics processing units (GPUs), application specific integrated circuit, and the like. In the FIG. 1 example, the processing circuit (120) can be configured to include various encoders, such as an audio encoder (130), a video encoder (not shown), and the like. In an example, one or more CPUs and/or GPUs can execute software to function as the audio encoder (130). In another example, the audio encoder (130) can be implemented using application specific integrated circuits.

In some examples, the audio encoder (130) is involved in a listening test setup that determines a plurality of loudness adjustments of sound signals. Further, the audio encoder (130) can suitably encode information of the plurality of loudness adjustments of sound signals in the coded bitstream, such as in metadata. For example, the audio encoder (140) can include a loudness controller (140) that determines a loudness adjustment based on a loudness of an adjusted speech signal. The loudness of the adjusted speech signal is a function of multiple speech signals associated with a scene. The scene can have the multiple speech signals in the sound signals associated with the scene. Then, metadata that is indicative of the adjusted speech signal, and the loudness adjustment of the adjusted speech signal can be included in the coded bitstream.

The interface circuit (111) can interface the immersive media encoding sub system (101) with the network. The interface circuit (111) can include a receiving portion that receives signals from the network and a transmitting portion that transmits signals to the network. For example, the interface circuit (111) can transmit signals that carry the coded bitstream to other devices, such as the immersive media decoding sub system (102), via the network.

The network is suitably coupled with the immersive media encoding sub system (101) and the immersive media decoding sub system (102) via wired and/or wireless connections, such as Ethernet connections, fiber-optic connections, WiFi connections, cellular network connections and the like. The network can include network server devices, storage devices, network devices and the like. The components of the network are suitably coupled together via wired and/or wireless connections.

The immersive media decoding sub system (102) is configured to decode the coded bitstream. In an example, the immersive media decoding sub system (102) can perform video decoding to reconstruct a sequence of video frames that can be displayed and perform audio decoding to reconstruct audio signals for playing.

The immersive media decoding sub system (102) can be implemented using any suitable technology. In the FIG. 1 example, the immersive media decoding sub system (102) is shown, but not limited to a head mounted display (HMD) with earphones as user equipment that can be used by a user. The immersive media decoding sub system (102) includes an interface circuit (161), and a processing circuit (170) coupled together as shown in FIG. 1

The interface circuit (161) can interface the immersive media decoding sub system (102) with the network. The interface circuit (161) can include a receiving portion that receives signals from the network and a transmitting portion that transmits signals to the network. For example, the interface circuit (161) can receive signals carrying data, such as signals carrying the coded bitstream from the network.

The processing circuit (170) can include suitable processing circuitry, such as CPU, GPU, application specific integrated circuits and the like. The processing circuit (170) can be configured to include various decoders, such an audio decoder (180), video decoder (not shown), and the like.

In some examples, the audio decoder (180) can decode audio content associated with a scene, and metadata indicative of an adjusted speech signal and a loudness adjustment of the adjusted speech signal. Further, the audio decoder (180) includes a loudness controller (190) that can adjust sound levels of the sound signals associated with the scene based on the adjusted speech signal and the loudness adjustment of the adjusted speech signal.

According to some aspects of the disclosure, the immersive media system (100) can be implemented according an immersive media standard, such as Moving Picture Expert Group Immersive (MPEG-I) suite of standards, including "immersive audio", "immersive video", and "systems support," The immersive media standard can support a YR or an AR presentation in which the user can navigate and interact with the environment using 6 degrees of freedom (6 DoF), that include spatial navigation (x, y, z) and user head orientation (yaw, pitch, roll).

The immersive media system (100) can impart the feeling that the user is actually present in a virtual world. In some examples, audio of a scene is perceived as in the real world, with sounds coming from associated visual figures. For example, sounds are perceived with the correct location and distance in the scene. Physical movement of the user in the real world is perceived as having matching movement in the scene of the virtual world. Further, the user can interact with the scene and cause sounds that are perceived as realistic and matching the user's experience in the real world.

Generally a listening test setup can be used, for example by content provider and/or technical provider, to determine sound levels for sound signals to achieve an immersive user experience. In some related examples, the sound levels (also referred to as loudness) of sound signals in a scene are adjusted based on a speech signal in the scene. In some examples, multiple speech signals present in the sound signals of a scene. Some aspects of the disclosure provide techniques for loudness adjustment based on an adjusted speech signal when the sound signals associated with the scene include multiple speech signals. The loudness of the adjusted speech signal is determined based on the multiple speech signals.

According to an aspect of the disclosure, a loudness adjustment procedure can be performed by a content creator or technical provider to determine a loudness adjustment of a scene with regard to a reference signal (also referred to as an anchor signal). In an example, the reference signal is a specific speech signal, such as a male English speech on track 50 of sound quality assessment material (SQAM) disc, in WAV file. In some examples, the loudness adjustment procedure is performed for pulse-code modulation (PCM) sound signals used in the encoder input format (EIF). In some examples, a binaural rendering tool, such as a general binaural renderer (GBR) with Dirac head related transfer function (HRTF) and the like can be used in the loudness adjustment procedure. The binaural rendering tool can simulate an audio environment of a scene and generate sound signals in WAV files in response to audio content of the scene.

In some examples, one or two measurement points in a scene can be determined, for example, by the content creator or the technical provider. These measurement points can represent positions on a scene task path that is of "normal" loudness for the scene.

In some examples, the binaural rendering tool can be used to define spatial relations of sound source locations and the measurement point, and output a scene output signal (e.g., sound signal) at the measurement point based on audio content at the sound source locations.

In some examples, a scene output signal (e.g., sound signal) is of a WAV file, and can be compared against the reference signal, and determine necessary adjustments of the sound level.

In an example, audio content of a scene includes speech content. In the binaural rendering tool, a measurement position and a location of a sound source for the speech content can be defined to be about a distance, such as a predefined distance (e.g., 1.5 meters), or a distance specific to the scene, apart. Other suitable configurations of the scene can be set in the binaural rendering tool and the binaural rendering tool can simulate an audio environment of the scene, and generate a scene output signal at the measurement position, such as a speech signal in WAV file, based on the speech content at the source sound source. Then, the speech signal can be compared with the reference signal to determine a loudness adjustment for the speech signal that can be used to match the loudness of the speech signal with the reference signal. In an example, loudness can be measured as a function of an average signal intensity in a time range. After the loudness adjustment of the speech signal is determined, sound level adjustment of other sound signals in the scene can be performed based on the loudness adjustment of the speech signal.

According to some aspects of the disclosure, two or more speech signals may present in a scene, and an adjusted speech signal can be determined based on the two or more speech signals. Then, a loudness adjustment of the adjusted speech signal is determined for example to match the loudness of the adjusted speech signal to the reference signal. Then, sound level adjustment of other sound signals (e.g., speech signals, non speech signals and the like) in the scene can be performed based on the loudness adjustment of the adjusted speech signal in a suitable way.

Further, in some examples, a loudest point on the scene task path can be identified by the content creator or technical provider. In an example, the loudness of sounds at the loudest point is checked to be free of clipping (e.g., below a limit for clipping). Further, in some examples, some very soft points or areas in the scene can be identified and checked for not being too silent.

It is noted that the adjusted speech signal can be determined based on the multiple speech signals in the scene using various techniques, and the loudness of the adjusted speech signal can be determined by various techniques. Assuming M (M is an integer that is larger than 1) speech signals are presented in a scene, and the loudness of the speech signals can be denoted by $S_1$, $S_2$, $S_3$, . . . , $S_M$, respectively.

In some embodiments, the adjusted speech signal can be one of the speech signals presented in the scene. In an example, the content creator or technical provider can determine the selection of one of the speech signals. The selection of the one of the speech signals can be indicated to in the coded bitstream or as part of the metadata associated with the audio content.

Specifically, in an example, in the binaural rendering tool, the measurement position and the sound source location for the selected speech signal can be defined. Other suitable configurations of the scene can be set in the binaural rendering tool and the binaural rendering tool can simulate an audio environment of the scene, and generate a scene output signal in WAV file based on audio content for the selected speech signal. The scene output signal is the adjusted speech signal in this example. The adjusted speech signal can be compared with the reference signal to determine a loudness adjustment for the adjusted speech signal. The loudness adjustment of the adjusted speech signal can be used to match the loudness of the adjusted speech signal with the reference signal. For example, when i is the index of the selected speech signal, $S_i$ is the loudness of the adjusted speech signal. Then, $S_i$ is compared with the loudness of the reference signal to determine loudness adjustment for the adjusted speech signal in the scene to match the loudness to the reference signal.

In some embodiments, the adjusted speech signal can be the loudest speech signal presented in the scene.

Specifically, in an example, to generate each speech signal in the scene, in the binaural rendering tool, the measurement position and the sound source location for the speech signal can be defined. Other suitable configurations of the scene can be set in the binaural rendering tool and the binaural rendering tool can simulate an audio environment of the scene, and generate a scene output signal in WAV file that is the speech signal can be perceived at the measurement location. Then, a loudest speech signal among the speech signals can be selected as the adjusted speech signal. The adjusted speech signal can be compared with the reference signal to determine a loudness adjustment for the loudest speech signal. The loudness adjustment can be used to match the loudness of the adjusted speech signal with the reference signal. For example, $S_{max}$ denotes maximum loudness among $S_1, S_2, S_3, \ldots, S_M$. The $S_{max}$ is compared with the loudness of the reference signal to determine loudness adjustment for the loudest speech signal in the scene.

In some embodiments, the adjusted speech signal corresponds to the quietest speech signal presented in the scene.

Specifically, in an example, to generate each speech signal in the scene, in the binaural rendering tool, the measurement position and the sound source location for the speech signal can be defined. Other suitable configurations of the scene can be set in the binaural rendering tool and the binaural rendering tool can simulate an audio environment of the scene, and generate a scene output signal in WAV file that is the speech signal perceived at the measurement position. Then, a quietest speech signal is determined among the speech signals to be the adjusted speech signal. The adjusted speech signal can be compared with the reference signal to determine a loudness adjustment for the adjusted speech signal. The loudness adjustment can be used to match the loudness of the adjusted speech signal with the reference signal. For example, $S_{min}$ denotes minimum loudness among $S_1, S_2, S_3, \ldots, S_M$. The $S_{min}$ is compared with the loudness of the reference signal to determine the loudness adjustment for the quietest speech signal in the scene.

In some embodiments, the adjusted speech signal can be the average of all speech signals presented in the scene.

Specifically, in an example, to generate each speech signal in the scene, in the binaural rendering tool, the measurement position and the sound source location for the speech signal can be defined. Other suitable configurations of the scene can be set in the binaural rendering tool and the binaural rendering tool can simulate an audio environment of the scene, and generate a scene output signal in WAV file which is the speech signal perceived at the measurement position. Then, an average loudness of the speech signals can be determined as the loudness of an adjusted speech signal which can be considered as a virtual signal. The average loudness can be compared with the loudness of the reference signal to determine a loudness adjustment. The loudness adjustment can be used to match the loudness of the adjusted speech signal with the reference signal. For example, $S_{average}$ denotes the average loudness of $S_1, S_2, S_3, \ldots, S_M$, and can be calculated according to Eq. (1)

$$S_{average}=(S_1+S_2+S_3+\ldots+S_M)/M \qquad \text{Eq. (1)}$$

$S_{average}$ is compared with the loudness of the reference signal to determine loudness adjustment for the adjusted speech signal.

In some embodiments, the adjusted speech signal can be the average of the loudest speech signal and the quietest speech signal presented in the scene.

Specifically, in an example, to generate each speech signal in the scene, in the binaural rendering tool, the measurement position and the sound source location for the speech signal can be defined. Other suitable configurations of the scene can be set in the binaural rendering tool and the binaural rendering tool can simulate an audio environment of the scene, and generate a scene output signal in WAV file which is the speech signal perceived at the measurement position. Then, a loudest speech signal and a quietest speech signal among the speech signals can be determined. The loudness of the adjusted speech signal is calculated as an average loudness of the loudest speech signal and the quietest speech signal. The loudness of the adjusted speech signal is compared with the loudness of the reference signal to determine a loudness adjustment for the adjusted speech signal. The loudness adjustment can be used to match the loudness of the adjusted speech signal with the reference signal. For example, $S_{max}$ denotes maximum loudness among $S_1, S_2, S_3, \ldots, S_M$, $S_{min}$ denotes minimum loudness among $S_1, S_2, S_3, \ldots, S_M$, and $S_a$ denotes an average loudness of the maximum loudness and the minimum loudness, and can be calculated according to Eq. (2):

$$S_a=(S_{max}+S_{min})/2 \qquad \text{Eq. (2)}$$

$S_a$ is compared with the loudness of the reference signal to determine loudness adjustment for the adjusted speech signal.

In some embodiments, the adjusted speech signal can be the median of all speech signals presented in the scene.

Specifically, in an example, to generate each speech signal in the scene, in the binaural rendering tool, the measurement position and the sound source location for the speech signal can be defined. Other suitable configurations of the scene can be set in the binaural rendering tool and the binaural rendering tool can simulate an audio environment of the scene, and generate a scene output signal in WAV file which is the speech signal perceived at the measurement position. Then, a median loudness among the speech signals can be determined as the loudness of the adjusted speech signal. The loudness of adjusted speech signal can be compared with the reference signal to determine a loudness adjustment for the adjusted speech signal. The loudness adjustment can be used to match the loudness of the adjusted speech signal with the reference signal. For example, $S_{median}$ denotes median loudness among $S_1, S_2, S_3, \ldots, S_M$ and can be represented by Eq. (3):

$$S_{median}=\text{median}\{S_1, S_2, S_3, \ldots, S_M\} \qquad \text{Eq. (3)}$$

$S_{median}$ is compared with the loudness of the reference signal to determine loudness adjustment for the adjusted speech signal.

In some embodiments, the adjusted speech signal corresponds to average of a quantile of all speech signals presented in the scene, for example, a quantile of 25% to 75%.

Specifically, in an example, to generate each speech signal in the scene, in the binaural rendering tool, the measurement position and the sound source location for the speech signal can be defined. Other suitable configurations of the scene can be set in the binaural rendering tool and the binaural rendering tool can simulate an audio environment of the scene, and generate a scene output signal in WAY file which is the speech signal perceived at the measurement position. Then, the speech signals can be sorted based on loudness to determine a group of speech signals that is of a quantile of the speech signals. Then, the loudness of the adjusted speech signal can be calculated as average loudness of the group of speech signals. The loudness of adjusted speech signal can be compared with the reference signal to determine a loudness adjustment for the adjusted speech signal. The loudness adjustment can be used to match the loudness of the adjusted speech signal with the reference signal. For example, $S_{qa\text{-}b}$ denotes the average loudness of a subset of $S_1, S_2, S_3, \ldots, S_M$ that are of a quantile from a % to b % and can be represented by Eq. (4)

$$S_{qa\text{-}b}=\text{Average}(\text{Quantile}_{a\%,b\%}\{S_1, S_2, S_3, \ldots, S_M\}) \qquad \text{Eq. (4)}$$

$S_{qa\text{-}b}$ is compared with the loudness of the reference signal to determine loudness adjustment for the adjusted speech signal.

In another example, $S_{q25-75}$ denotes the average loudness of a subset of $S_1, S_2, S_3, \ldots, S_M$ that are of a quantile from 25% to 75% and can be represented by Eq. (5)

$$S_{q25-75}=\text{Average }(\text{Quantile}_{25\%,75\%}\{S_1, S_2, S_3, \ldots, S_M\}) \quad \text{Eq. (5)}$$

$S_{q25-75}$ is compared with the loudness of the reference signal to determine loudness adjustment for the adjusted speech signal.

In some embodiments, the adjusted speech signal can be the speech signal which is located closest to the clustering center of all speech signals presented in the scene.

Specifically, in an example, a sound source location of a speech signal that is located closest to a clustering center of all speech signals can be determined based on sound source locations of the speech signals, and the speech signal is referred to center speech signal. In the binaural rendering tool, the measurement position and the sound source location for the center speech signal can be defined. Other suitable configurations of the scene can be set in the binaural rendering tool and the binaural rendering tool can simulate an audio environment of the scene, and generate a scene output signal in WAV file which is the center speech signal perceived at the measurement position. Then, the center speech signal is the adjusted speech signal in this example. The loudness of the adjusted speech signal can be compared with the reference signal to determine a loudness adjustment for the adjusted speech signal. The loudness adjustment of the center speech signal can be used to match the loudness of the adjusted speech signal with the reference signal. For example, $S_{center}$ denotes one of $S_1, S_2, S_3, \ldots, S_M$ with corresponding speech signal being the center speech signal, and can be represented by Eq. (6)

$$S_{center}=\text{clustering\_center}\{S_1, S_2, S_3, \ldots, S_M\} \quad \text{Eq. (6)}$$

In some embodiments, the adjusted speech signal can be a weighted average of all speech signals presented in the scene, where the weight can be distance based, or loudness based.

Specifically, in an example, to generate each speech signal in the scene, in the binaural rendering tool, the measurement position and the sound source location for the speech signal can be defined. Other suitable configurations of the scene can be set in the binaural rendering tool and the binaural rendering tool can simulate an audio environment of the scene, and generate a scene output signal in WAY file which is the speech signal perceived at the measurement position. Then, a weighted average loudness of the speech signals can be calculated and used as the loudness of an adjusted speech signal. The adjusted speech signal can be considered as a virtual signal. The weighted average loudness can be compared with the loudness of the reference signal to determine a loudness adjustment. For example, $S_{weight}$ denotes the weighted average loudness; $w_1, w_2, w_3, \ldots, w_M$ denote weights respectively for $S_1, S_2, S_3, \ldots, S_M$ and $S_{weight}$ can be calculated according to Eq. (7)

$$S_{weight}=S_1\times w_1+S_2\times w_2+S_3\times w_3+ \ldots +S_M\times w_M \quad \text{Eq. (7)}$$

In an example, a sum of the weights $w_1, w_2, w_3, \ldots, w_M$ is equal to 1. $S_{weight}$ is compared with the loudness of the reference signal to determine loudness adjustment for the adjusted speech signal. In some examples, the weights $w_1, w_2, w_3, \ldots, w_M$ are respectively determined based on distance of the respective sound source location to the measurement position. In some examples, the weights $w_1, w_2, w_3, \ldots, w_M$ are respectively determined based on the loudness $S_1, S_2, S_3, \ldots, S_M$.

Figure 2:
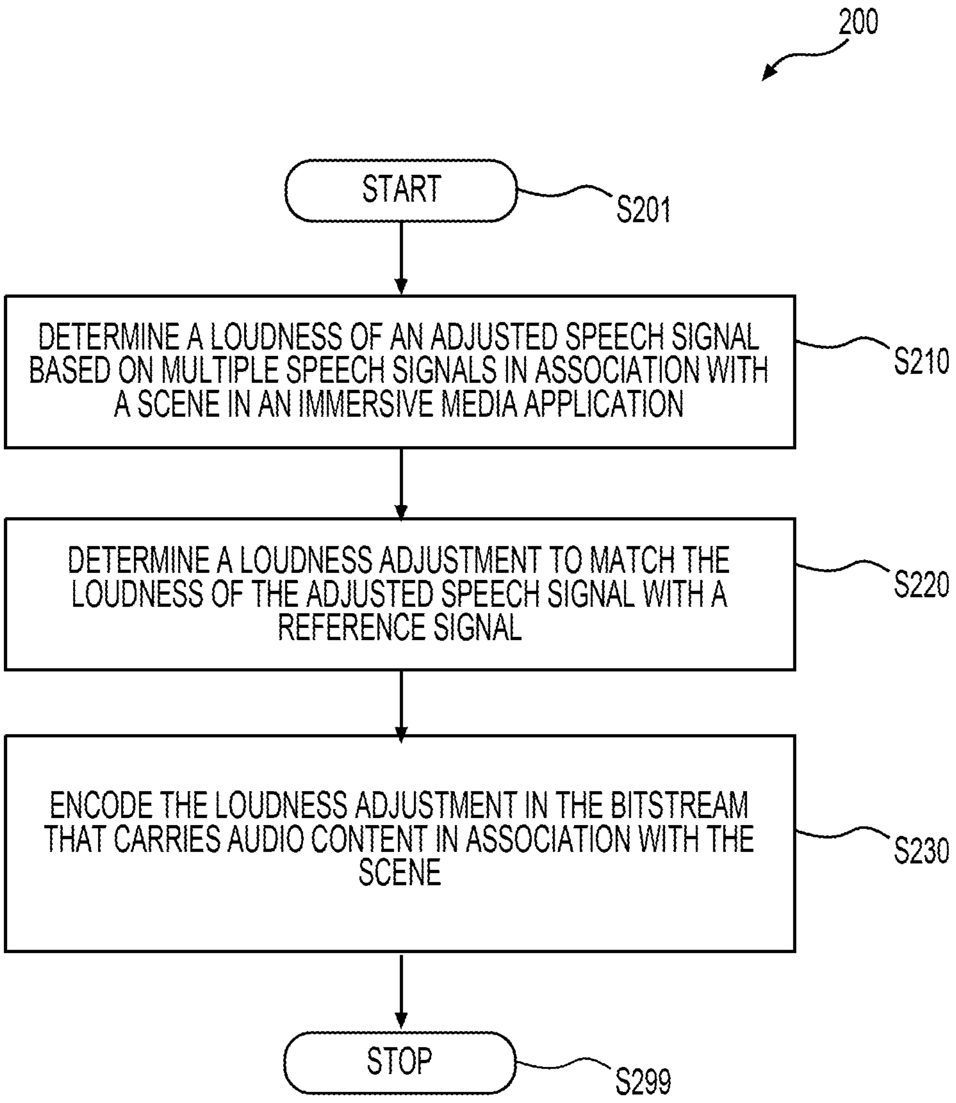
FIG. 2 shows a flow chart outlining a process example according to an embodiment of the disclosure.

FIG. 2 shows a flow chart outlining a process (200) according to an embodiment of the disclosure. The process (200) can be used in audio coding, such as used in the immersive media encoding sub system (101), and executed by the processing circuit (120), and the like. In some embodiments, the process (200) is implemented in software instructions, thus when the processing circuitry executes the software instructions, the processing circuitry performs the process (200). The process starts at (S201) and proceeds to (S210).

At (S210), a loudness of an adjusted speech signal is determined based on multiple speech signals in association with a scene in an immersive media application.

At (S220), a loudness adjustment to match the loudness of the adjusted speech signal with a reference signal is determined.

At (S230), the loudness adjustment is encoded in a bitstream that carries audio content in association with the scene.

In some examples, the adjusted speech signal is one of the multiple speech signals, and an index indicative of a selection of the adjusted speech signal from the multiple speech signals can be encoded in the bitstream.

In some examples, one of a loudest speech signal or a quietest speech signal in the multiple speech signals can be selected to be the adjusted speech signal.

In some examples, an average loudness of the multiple speech signals is determined to be the loudness of the adjusted speech signal.

In some examples, an average loudness of a loudest speech signal and a quietest speech signal in the multiple speech signals is determined to be the loudness of the adjusted speech signal.

In some examples, a median loudness of the multiple speech signals is determined to be the loudness of the adjusted speech signal.

In some examples, an average loudness of a group of speech signals is determined to be the loudness of the adjusted speech signal. The group of speech signals is of a quantile of the multiple speech signals, such as a quantile of 20% to 75%, and the like.

In some examples, a speech signal associated with a location in the scene is determined to be the adjusted speech signal. The location is a closest location to a center of locations associated with the multiple speech signals in the scene.

In some examples, a weighted average loudness of the multiple speech signals is determined to be the loudness of the adjusted speech signal. In an example, weights are determined for the multiple speech signals based on locations of the multiple speech signals. In another example, weights are determined for the multiple speech signals based on respective loudness of the multiple speech signals.

Then, the process proceeds to (S299) and terminates.

Figure 3:
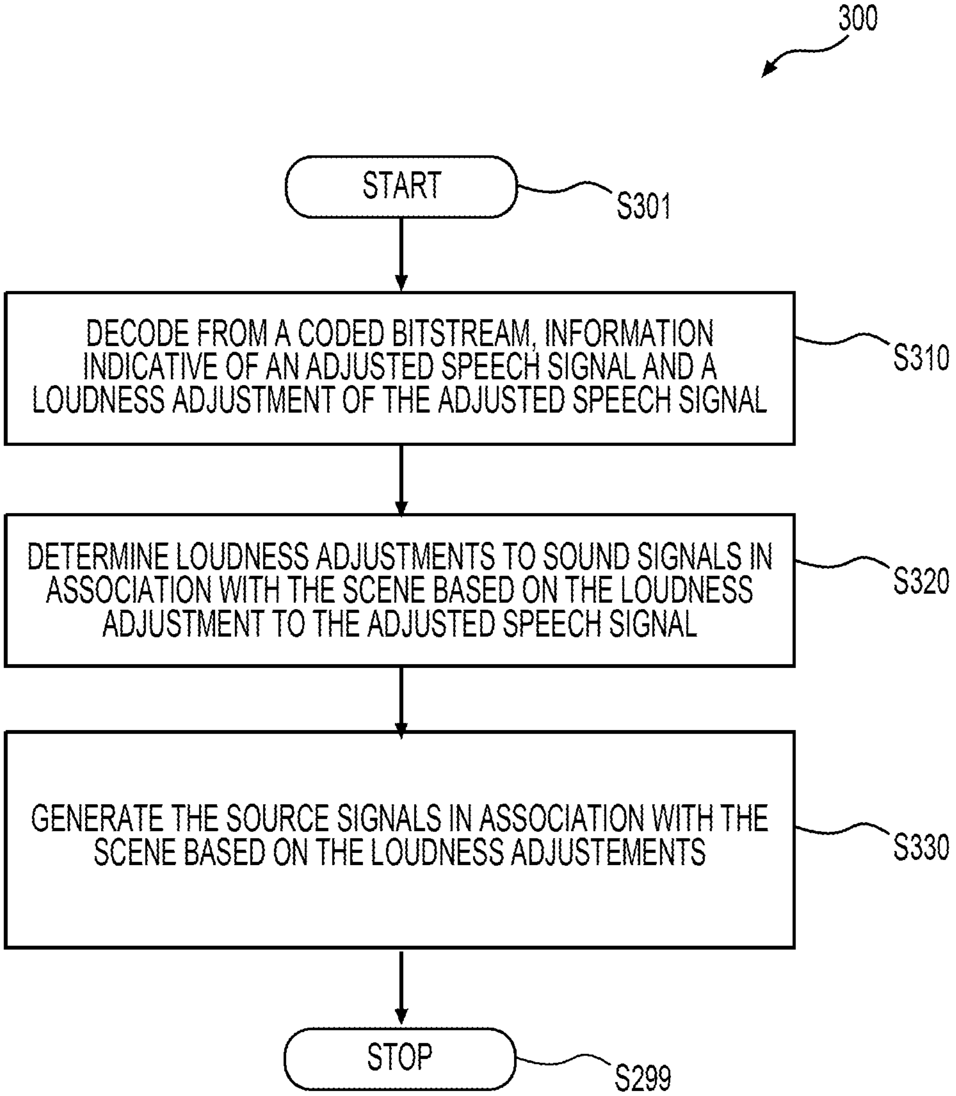
FIG. 3 shows a flow chart outlining another process example according to an embodiment of the disclosure.

FIG. 3 shows a flow chart outlining a process (300) according to an embodiment of the disclosure. The process (300) can be used in audio coding, such as used in the immersive media decoding sub system (102), and executed by the processing circuit (170), and the like. In some embodiments, the process (300) is implemented in software instructions, thus when the processing circuitry executes the software instructions, the processing circuitry performs the process (300). The process starts at (S301) and proceeds to (S310).

At (S310), information indicative of an adjusted speech signal and a loudness adjustment to the adjusted speech signal are decoded from a coded bitstream. The adjusted speech signal is indicated in an association with multiple speech signals in a scene of an immersive media application.

At (S320), a plurality of loudness adjustments to sound signals including the multiple speech signals in the scene are determined based the loudness adjustment to the adjusted speech signal At (S330), the sound signals in the scene are generated based on the plurality of loudness adjustments to the sound signals.

In some examples, an index that is indicative of one of the multiple speech signals being the adjusted speech signal is decoded from the coded bitstream.

In an example, the information is indicative of a loudest speech signal in the multiple speech signals being the adjusted speech signal. In another example, the information is indicative of a quietest speech signal in the multiple speech signals being the adjusted speech signal.

In some examples, the information is indicative of the adjusted speech signal having an average loudness of the multiple speech signals.

In some examples, the information is indicative of the adjusted speech signal having an average loudness of a loudest speech signal and a quietest speech signal in the multiple speech signals.

In some examples, the information is indicative of the adjusted speech signal having a median loudness of the multiple speech signals.

In some examples, the information is indicative of the adjusted speech signal having an average loudness of a group of speech signals. The group of speech signals has loudness of a quantile of the multiple speech signals, such as a quantile of 25% to 75% and the like.

In some examples, a speech signal associated with a location is determined to be the adjusted speech signal. For example, the location is the sound source location of the speech signal. The location is a closest location to a center of locations associated with the multiple speech signals.

In some examples, the information is indicative of the adjusted speech signal having a weighted average loudness of the multiple speech signals. In an example, weights respectively for the multiple speech signals are determined based on locations of the multiple speech signals. In another example, weights respectively for the multiple speech signals are determined based on respective loudness of the multiple speech signals.

Then, the process proceeds to (S399) and terminates.

The techniques described above, can be implemented as computer software using computer-readable instructions and physically stored in one or more computer-readable media. For example, FIG. 4 shows a computer system (400) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, Internet of things devices, and the like.

Figure 4:
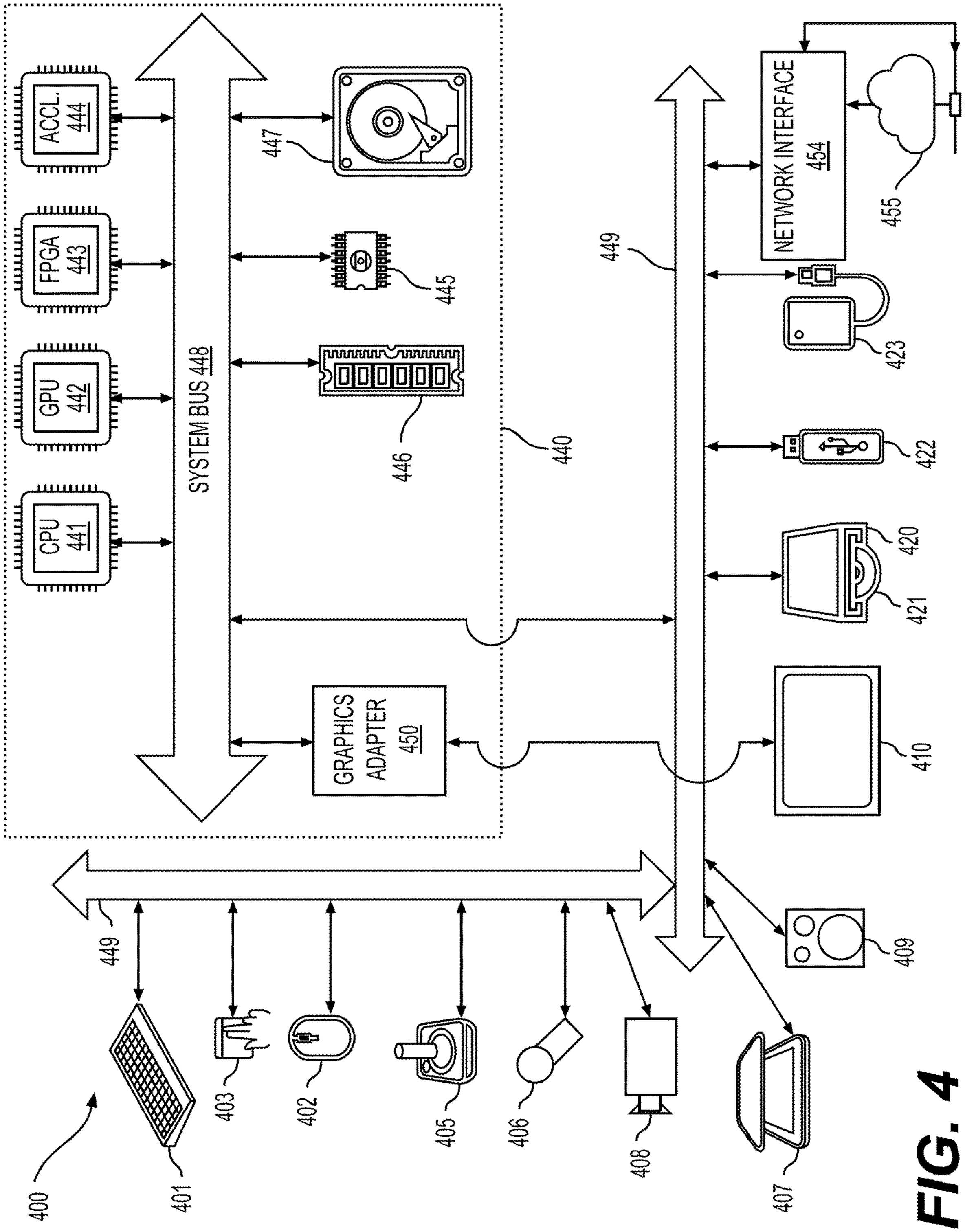
FIG. 4 is a schematic illustration of a computer system in accordance with an embodiment.

The components shown in FIG. 4 for computer system (400) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (400).

Computer system (400) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (401), mouse (402), trackpad (403), touch screen (410), data-glove (not shown), joystick (405), microphone (406), scanner (407), camera (408).

Computer system (400) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (410), data-glove (not shown), or joystick (405), but there can also be tactile feedback devices that do not serve as input devices), audio output devices (such as: speakers (409), headphones (not depicted)), visual output devices (such as screens (410) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (400) can also include human accessible storage devices and their associated media such as optical media including CD/DVD ROM/RW (420) with CD/DVD or the like media (421), thumb-drive (422), removable hard drive or solid state drive (423), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (400) can also include an interface (454) to one or more communication networks (455). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (449) (such as, for example USB ports of the computer system (400)); others are commonly integrated into the core of the computer system (400) by attachment to a system bus as described below (for example Ethernet interface into a PC computer system or cellular network interface into a smartphone computer system). Using any of these networks, computer system (400) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (440) of the computer system (400).

The core (440) can include one or more Central Processing Units (CPU) (441), Graphics Processing Units (GPU) (442), specialized programmable processing units in the form of Field Programmable Gate Areas (FPGA) (443), hardware accelerators for certain tasks (444), graphics adapters (450), and so forth. These devices, along with Read-only memory (ROM) (445), Random-access memory (446), internal mass storage such as internal non-user accessible hard drives, SSDs, and the like (447), may be connected through a system bus (448). In some computer systems, the system bus (448) can be accessible in the form of one or more physical plugs to enable extensions by additional CPUs, GPU, and the like. The peripheral devices can be attached either directly to the core's system bus (448), or through a peripheral bus (449). In an example, the screen (410) can be connected to the graphics adapter (450). Architectures for a peripheral bus include PCI, USB, and the like.

CPUs (441), GPUs (442), FPGAs (443), and accelerators (444) can execute certain instructions that, in combination, can make up the aforementioned computer code. That computer code can be stored in ROM (445) or RAM (446). Transitional data can also be stored in RAM (446), whereas permanent data can be stored for example, in the internal mass storage (447). Fast storage and retrieve to any of the memory devices can be enabled through the use of cache memory, that can be closely associated with one or more CPU (441), GPU (442), mass storage (447), ROM (445), RAM (446), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (400), and specifically the core (440) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (440) that are of non-transitory nature, such as core-internal mass storage (447) or ROM (445). The software implementing various embodiments of the present disclosure can be stored in such devices and executed by core (440). A computer-readable medium can include one or more memory devices or chips, according to particular needs. The software can cause the core (440) and specifically the processors therein (including CPU, GPU, FPGA, and the like) to execute particular processes or particular parts of particular processes described herein, including defining data structures stored in RAM (446) and modifying such data structures according to the processes defined by the software. In addition or as an alternative, the computer system can provide functionality as a result of logic hardwired or otherwise embodied in a circuit (for example: accelerator (444)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for audio decoding processing, comprising:

decoding, by a processor and from a coded bitstream, information indicative of a single adjusted speech signal and a loudness adjustment to the single adjusted speech signal, the single adjusted speech signal being indicated in an association with multiple speech signals in a scene of an immersive media application, the information indicating that the loudness adjustment to the single adjusted speech signal is determined according to a listening test with a reference signal from a sound quality assessment material and being provided in the coded bitstream, the information indicating that the loudness adjustment to the single adjusted speech signal causes a loudness of the single adjusted speech signal to be rendered for a predefined position in the scene to match a loudness of the reference signal, the information indicating that the loudness adjustment to the single adjusted speech signal is used to further process the multiple speech signals and is based on an average of a plurality of speech signals between a first quantile of the multiple speech signals and a second quantile of the multiple speech signals;

determining, by the processor, a plurality of loudness adjustments to sound signals including the multiple speech signals in the scene based on the loudness adjustment to the single adjusted speech signal; and generating, by the processor, the sound signals in the scene based on the plurality of loudness adjustments to the sound signals.

2. The method of claim 1, further comprising:

decoding, from the coded bitstream, an index that is indicative of one of the multiple speech signals being the single adjusted speech signal.

3. The method of claim 1, wherein the information is indicative of at least one of:

a loudest speech signal in the multiple speech signals being the single adjusted speech signal; or a quietest speech signal in the multiple speech signals being the single adjusted speech signal.

4. The method of claim 1, wherein the information is indicative of the single adjusted speech signal having an average loudness of the multiple speech signals.

5. The method of claim 1, wherein the information is indicative of the single adjusted speech signal having an average loudness of a loudest speech signal and a quietest speech signal in the multiple speech signals.

6. The method of claim 1, wherein the information is indicative of the single adjusted speech signal having a median loudness of the multiple speech signals.

7. The method of claim 1, wherein the information is indicative of the single adjusted speech signal having an average loudness of a group of speech signals, the group of speech signals having loudness of a quantile of the multiple speech signals.

8. The method of claim 1, further comprising:

determining a speech signal associated with a location to be the single adjusted speech signal, the location being a closest location to a center of locations associated with the multiple speech signals.

9. The method of claim 1, wherein the information is indicative of the single adjusted speech signal having a weighted average loudness of the multiple speech signals.

10. The method of claim 9, further comprising at least one of:

determining weights respectively for the multiple speech signals based on locations of the multiple speech signals; or determining weights respectively for the multiple speech signals based on respective loudness of the multiple speech signals.

11. A method for audio encoding processing, the method comprising:

performing a loudness adjustment to a single adjusted speech signal that is in an association with multiple speech signals in a scene of an immersive media application, the loudness adjustment to the single adjusted speech signal being performed according to a listening test with a reference signal from a sound quality assessment material, the loudness adjustment to the single adjusted speech signal causing a loudness of the single adjusted speech signal to be rendered for a predefined position in the scene to match a loudness of the reference signal, the loudness adjustment to the single adjusted speech signal being used to further process the multiple speech signals and being based on an average of a plurality of speech signals between a first quantile of the multiple speech signals and a second quantile of the multiple speech signals;

determining a plurality of loudness adjustments to sound signals including the multiple speech signals in the scene based on the loudness adjustment to the single adjusted speech signal;

generating the sound signals in the scene based on the plurality of loudness adjustments to the sound signals; and encoding information into a bitstream, the information being indicative of the single adjusted speech signal and the loudness adjustment to the single adjusted speech signal.

12. The method of claim 11, further comprising:

encoding an index into the bitstream that is indicative of one of the multiple speech signals being the single adjusted speech signal.

13. The method of claim 11, wherein the information is indicative of at least one of:

a loudest speech signal in the multiple speech signals being the single adjusted speech signal; or a quietest speech signal in the multiple speech signals being the single adjusted speech signal.

14. The method of claim 11, wherein the information is indicative of the single adjusted speech signal having an average loudness of the multiple speech signals.

15. The method of claim 11, wherein the information is indicative of the single adjusted speech signal having an average loudness of a loudest speech signal and a quietest speech signal in the multiple speech signals.

16. The method of claim 11, wherein the information is indicative of the single adjusted speech signal having a median loudness of the multiple speech signals.

17. The method of claim 11, wherein the information is indicative of the single adjusted speech signal having an average loudness of a group of speech signals, the group of speech signals having loudness of a quantile of the multiple speech signals.

18. The method of claim 11, further comprising:

determine a speech signal associated with a location to be the single adjusted speech signal, the location being a closest location to a center of locations associated with the multiple speech signals.

19. The method of claim 11, wherein the information is indicative of the single adjusted speech signal having a weighted average loudness of the multiple speech signals.

20. A non-transitory computer readable medium storing a media bitstream encoded by an encoding method, the encoding method comprising:

performing a loudness adjustment to a single adjusted speech signal that is in an association with multiple speech signals in a scene of an immersive media application, the loudness adjustment to the single adjusted speech signal being performed according to a listening test with a reference signal from a sound quality assessment material, the loudness adjustment to the single adjusted speech signal causing a loudness of the single adjusted speech signal to be rendered for a predefined position in the scene to match a loudness of the reference signal, the loudness adjustment to the single adjusted speech signal being used to further process the multiple speech signals and being based on an average of a plurality of speech signals between a first quantile of the multiple speech signals and a second quantile of the multiple speech signals;

determining a plurality of loudness adjustments to sound signals including the multiple speech signals in the scene based on the loudness adjustment to the single adjusted speech signal;

generating the sound signals in the scene based on the plurality of loudness adjustments to the sound signals; and encoding information into the media bitstream, the information being indicative of the single adjusted speech signal and the loudness adjustment to the single adjusted speech signal.

* * * * *